United States Patent
Kondo et al.

(10) Patent No.: US 11,319,486 B2
(45) Date of Patent: May 3, 2022

(54) CERAMIC COMPLEX LIGHT EMITTING DEVICE USING THE SAME, AND METHOD FOR PRODUCING CERAMIC COMPLEX

(71) Applicant: NICHIA CORPORATION, Anan (JP)

(72) Inventors: Masaki Kondo, Tokushima (JP); Shozo Taketomi, Tokushima (JP); Takafumi Sumie, Anan (JP); Seigo Sunagawa, Anan (JP); Hirofumi Ooguri, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 309 days.

(21) Appl. No.: 16/704,477

(22) Filed: Dec. 5, 2019

(65) Prior Publication Data

US 2020/0181487 A1 Jun. 11, 2020

(30) Foreign Application Priority Data

Dec. 7, 2018 (JP) .............................. JP2018-230118

(51) Int. Cl.
*C09K 11/77* (2006.01)
*C01F 17/34* (2020.01)
(Continued)

(52) U.S. Cl.
CPC .......... *C09K 11/7706* (2013.01); *C01F 17/34* (2020.01); *C04B 35/117* (2013.01); *C04B 35/44* (2013.01); *C04B 35/50* (2013.01); *C04B 35/64* (2013.01); *C09K 11/7774* (2013.01); *G03B 21/204* (2013.01); *C01P 2002/30* (2013.01); *C01P 2006/60* (2013.01); *C04B 2235/3217* (2013.01); *C04B 2235/3222* (2013.01);
(Continued)

(58) Field of Classification Search
CPC ... C09K 11/7774; C04B 35/117; C04B 35/44; C04B 35/50; C04B 35/66; C04B 2235/3217; C04B 2235/3222; C04B 2235/3224; C04B 2235/664; C04B 2235/77; C04B 2235/94; C04B 2235/9653
See application file for complete search history.

(56) References Cited

U.S. PATENT DOCUMENTS 8,932,887 B2 * 1/2015 Lei ..................... C09K 11/7774
438/26
2020/0161506 A1 * 5/2020 Yu ..................... C04B 35/62635

FOREIGN PATENT DOCUMENTS

| JP | 2014-186882 A | 10/2014 |
| JP | 2014-234487 A | 12/2014 |
| JP | 2017-058550 A | 3/2017 |

* cited by examiner

*Primary Examiner* — C Melissa Koslow
(74) *Attorney, Agent, or Firm* — Hunton Andrews Kurth LLP

(57) ABSTRACT

A ceramic complex that has improved optical characteristics including luminous efficiency is provided. A method for producing a ceramic complex, including: preparing a molded body containing rare earth aluminum garnet fluorescent material, aluminum oxide, and lutetium oxide, and having a content of the rare earth aluminum garnet fluorescent material in a range of 15% by mass or more and 50% by mass or less, and a content of the lutetium oxide in a range of 0.2% by mass or more and 4.5% by mass or less, based on the total amount of the rare earth aluminum garnet fluorescent material, the aluminum oxide, and the lutetium oxide; and calcining the molded body in an air atmosphere to provide a ceramic complex having a relative density in a range of 90% or more and less than 100%.

10 Claims, 1 Drawing Sheet

(51) Int. Cl.
  *G03B 21/20* (2006.01)
  *C04B 35/117* (2006.01)
  *C04B 35/44* (2006.01)
  *C04B 35/64* (2006.01)
  *C04B 35/50* (2006.01)
(52) U.S. Cl.
  CPC ............... *C04B 2235/3224* (2013.01); *C04B 2235/664* (2013.01); *C04B 2235/77* (2013.01); *C04B 2235/94* (2013.01); *C04B 2235/9653* (2013.01)

CERAMIC COMPLEX LIGHT EMITTING DEVICE USING THE SAME, AND METHOD FOR PRODUCING CERAMIC COMPLEX

CROSS-REFERENCE TO RELATED PATENT APPLICATION

This application claims priority to Japanese Patent Application No. 2018-230118, filed on Dec. 7, 2018, the disclosure of which is hereby incorporated by reference in its entirety.

BACKGROUND

Technical Field

The present disclosure relates to a ceramic complex, a light emitting device using the same, and a method for producing a ceramic complex.

Description of Related Art

A light emitting device including a combination of a light emitting element, such as a light emitting diode (which may be hereinafter referred to as "LED") or a laser diode (which may be hereinafter referred to as "LD"), and a ceramic complex containing a fluorescent material that converts the wavelength of light emitted from the light emitting element has been used as a light source for automobile use, generic illumination use, a backlight for a liquid crystal display device, a projector.

Examples of the fluorescent material that converts light from a light emitting element include a rare earth aluminum garnet fluorescent material containing a rare earth, such as yttrium or lutetium. As a ceramic complex including the fluorescent material, for example, Japanese Unexamined Patent Publication No. 2014-234487 describes a ceramic complex obtained by mixing an inorganic material and an inorganic fluorescent material, and melting and solidifying the inorganic material.

SUMMARY

However, the ceramic complex described in Japanese Unexamined Patent Publication No. 2014-234487 is insufficient in optical characteristics including luminous efficiency.

Under the circumstances, an embodiment of the present disclosure provides a ceramic complex that has improved optical characteristics including luminous efficiency, and a method for producing the same.

The present disclosure encompasses the following embodiments.

A first embodiment of the present disclosure relates to a ceramic complex containing a rare earth aluminum garnet fluorescent material, aluminum oxide, and lutetium oxide, having a content of the rare earth aluminum garnet fluorescent material of 15% by mass or more and 50% by mass or less, and a content of the lutetium oxide of 0.2% by mass or more and 4.5% by mass or less, based on the total amount of the rare earth aluminum garnet fluorescent material, the aluminum oxide, and the lutetium oxide as 100% by mass.

A second embodiment of the present disclosure relates to a method for producing a ceramic complex, including: preparing a molded body containing rare earth aluminum garnet fluorescent material, aluminum oxide, and lutetium oxide, and having a content of the rare earth aluminum garnet fluorescent material in a range of 15% by mass or more and 50% by mass or less, and a content of the lutetium oxide in a range of 0.2% by mass or more and 4.5% by mass or less, based on the total amount of the rare earth aluminum garnet fluorescent material, the aluminum oxide, and the lutetium oxide as 100% by mass; and calcining the molded body in an air atmosphere to provide a ceramic complex having a relative density of 90% or more and less than 100%.

According to embodiments of the present disclosure, a ceramic complex that has improved optical characteristics including luminous efficiency, a light emitting device using the same, and a method for producing a ceramic complex can be provided.

DETAILED DESCRIPTION

Embodiments of the ceramic complex and the method for producing a ceramic complex according to the present disclosure will be described with reference to embodiments below. However, the embodiments shown below are examples for substantiating the technical concept of the present disclosure, and the present disclosure is not limited to the ceramic complex and the method for producing a ceramic complex shown below. The relationships between the color names and the color coordinates, the relationships between the wavelength ranges of light and the color names of monochromatic light, and the like are in accordance with JIS Z8110.

Ceramic Complex

The ceramic complex may contain a rare earth aluminum garnet fluorescent material, aluminum oxide, and lutetium oxide, and may have a content of the rare earth aluminum garnet fluorescent material in a range of 15% by mass or more and 50% by mass or less, and a content of the lutetium oxide in a range of 0.2% by mass or more and 4.5% by mass or less, based on the total amount of the rare earth aluminum garnet fluorescent material, the aluminum oxide, and the lutetium oxide.

The ceramic complex may have a matrix formed of aluminum oxide, and present therein, rare earth aluminum garnet fluorescent material particles that are discriminated by grain boundaries from aluminum oxide constituting the matrix (which may be hereinafter referred to as a base material), and the aluminum oxide and the rare earth aluminum garnet fluorescent material may be integrated to constitute the ceramic complex. The ceramic complex preferably contains, for example, the rare earth aluminum garnet fluorescent material having an average particle diameter in a range of 10 μm or more and 40 μm or less, and the rare earth aluminum garnet fluorescent material having a relatively large average particle diameter can enhance the wavelength conversion efficiency of the incident light and can enhance the luminous efficiency.

The ceramic complex has the base material of the ceramic complex constituted by aluminum oxide, and contains the rare earth aluminum garnet fluorescent material and lutetium oxide in the base material of aluminum oxide. The ceramic complex contains in a range of 0.2% by mass or more and 4.5% by mass or less of lutetium oxide in the base material. Accordingly, the light incident on the ceramic complex is diffusely reflected by the lutetium oxide inside the ceramic complex. The ceramic complex contains the rare earth aluminum garnet fluorescent material along with the lutetium oxide in the aluminum oxide as the base material, and therefore the light having been diffusely reflected by the lutetium oxide is efficiently subjected to wavelength conversion by the rare earth aluminum garnet fluorescent material, and is emitted to the outside of the ceramic complex, resulting in a high extraction efficiency of light, i.e., a high luminous efficiency. In the ceramic complex, furthermore, the light incident on the ceramic complex is diffusely reflected by the lutetium oxide contained in the aluminum oxide as the base material, and multiply-reflected inside the ceramic complex, and therefore the ceramic complex can emit light on a path that is closer to the direction perpendicular to the emission surface, thereby focusing the emitted light to the target position.

Relative Density of Ceramic Complex

In the present specification, the relative density means a value that is calculated from the apparent density of the ceramic complex with respect to the true density of the ceramic complex. The relative density is calculated by a following calculation formula (1).

Relative density (%) of ceramic complex=(Apparent density of ceramic complex÷True density of ceramic complex)×100     (1)

The true density of the ceramic complex is calculated by a following calculation formula (2) from a mass ratio Pm (% by mass) of the rare earth aluminum garnet fluorescent material contained in the ceramic complex, a true density Pd (g/cm$^3$) of the rare earth aluminum garnet fluorescent material, a mass ratio Am (% by mass) of the aluminum oxide contained in the ceramic complex, a true density Ad (g/cm$^3$) of the aluminum oxide, a true density Ld (g/cm$^3$) of the lutetium oxide contained in the ceramic complex, and a mass ratio Lm (% by mass) of the lutetium oxide.

$$\text{True density of ceramic complex} = \frac{P_m + A_m + L_m}{(P_m/P_d) + (A_m/A_d) + (L_m/L_d)} \quad (2)$$

Mass ratio (% by mass) of rare earth aluminum garnet fluorescent material: $P_m$
True density (g/cm$^3$) of rare earth aluminum garnet fluorescent material: $P_d$
Mass ratio (% by mass) of aluminum oxide: $A_m$
True density (g/cm$^3$) of aluminum oxide: $A_d$
Mass ratio (% by mass) of lutetium oxide: $L_m$
True density (g/cm$^3$) of lutetium oxide: $L_d$
$P_m + A_m + L_m = 100$ The apparent density of the ceramic complex refers to a value obtained by dividing the mass (g) of the ceramic complex by the volume (cm$^3$) of the ceramic complex determined by the Archimedes' method. The apparent density of the ceramic complex is calculated according to the following calculation formula (3).

Apparent density of ceramic complex×Mass (g) of ceramic complex÷Volume (cm$^3$) of ceramic complex (Archimedes method)     (3)

It is preferred that the ceramic complex has a plate-like body having a first principal surface serving as an incidence surface of light and a second principal surface serving as an outgoing surface of light, which is positioned on the opposite side to the first principal surface and the plate thickness of the plate-like body is in a range of 90 µm or more and 300 µm or less. More preferably, the plate sickness thickness of the plate-like body is in a range of 90 µm or more and 250 µm or less, the light incident on the ceramic complex can be efficiently subjected to wavelength conversion, and the luminous efficiency can be enhanced. Furthermore, the incident light and the light having been subjected to wavelength conversion can be scattered by diffusely reflecting by the lutetium oxide contained in the ceramic complex, and the extraction efficiency of light can be enhanced.

The ceramic complex preferably has a ratio of the light diameter of an outgoing light emitted from second principal surface to a light diameter of incident light to be allowed to inter the first principal surface is in a range of 0.40 or more and less than 1.0, and more preferably in a rage of 0.60 or more and 0.99 or less. In the case where the ratio of light diameters (which may be hereinafter referred to as a "light diameter ratio (light diameter of outgoing light/light diameter of incident light)") is in a range of 0.40 or more and less than 1.0, the diffusion of the light emitted from the ceramic complex can be suppressed, and the emitted light can be focused to the target position. The light diameter of the incident light to be allowed to enter the first principal surface of the ceramic complex is the light diameter of the light emitted from the light source. The light diameter of the incident light can be measured, for example, with a color luminance meter. The light diameter of the incident light is preferably in a range of 1 mm or more and 5 mm or less, and more preferably in a range of 2 mm or more and 4 mm or less. The light diameter of outgoing light emitted from the second principal surface of the ceramic complex may be measured in the following manner. The light emission luminance of the light emitted from the ceramic complex is measured with a color luminance meter. In the resulting light emission spectrum, with the position showing the maximum luminance designated as the center (measurement center), the distances (mm) of the two positions, at which the light emission spectrum shows a luminance that is $\frac{1}{100}$ of the maximum luminance (which may be hereinafter referred to as a "$\frac{1}{100}$ luminance"), from the measurement center are measured as absolute values, and the sum of the absolute values of the distances (mm) of the two positions, at which the light emission spectrum shows a luminance that is $\frac{1}{100}$ of the maximum luminance, from the measurement center is designated as the light diameter of outgoing light emitted from the second principal surface.

Rare Earth Aluminum Garnet Fluorescent Material

The content of the rare earth aluminum garnet fluorescent material contained in the ceramic complex may be in a range of 15% by mass or more and 50% by mass or less, preferably in a range of 20% by mass or more and 50% by mass or less, more preferably in a range of 22% by mass or more and 48% by mass or less, and further preferably in a range of 23% by mass or more and 45% by mass or less. In the case where the content of the rare earth aluminum garnet fluorescent material in the ceramic complex is less than 15% by mass, the wavelength conversion efficiency is lowered, and the luminous efficiency is lowered, due to the decreased amount of the fluorescent material. In the case where the content of the rare earth aluminum garnet fluorescent material in the ceramic complex exceeds 50% by mass, the amount of the aluminum oxide is relatively decreased, and the strength of the ceramic complex may be lowered in some cases.

The rare earth aluminum garnet fluorescent material preferably has a composition represented by the following formula (I).

$$(Ln_{1-a}Ce_a)_3(Al_cGa_b)_5O_{12} \quad (I)$$

In the above formula (I), Ln represents at least one rare earth element selected from the group consisting of Y, Gd, Lu, and Tb, and a, b, and c represent numbers that satisfy $0<a\leq0.022$, $0\leq b\leq0.4$, $0<c\leq1.1$, and $0.9\leq b+c\leq1.1$.

In the above formula (I), Ln represents at least one rare earth element selected from the group consisting of Y, Gd, Lu, and Tb, and two or more kinds of rare earth elements may be contained. Ce is an activation element for the fluorescent material, and the product of the parameter a and 3 shows the molar ratio of Ce in the composition represented by the formula (I). The parameter a is more preferably in range of 0.00005 or more and 0.021 or less ($0.005\times10^{-2}\leq a\leq0.021$), and further preferably in a range of 0.0001 or more and 0.020 or less ($0.01\times10^{-2}\leq a\leq0.020$). In the composition represented by the formula (I), the product of the parameter b and 5 shows the molar ratio of Ga. In the composition represented by the formula (I), for achieving the target particle diameter and the wavelength conversion to the target color, the parameter b may be in a range of 0.00001 or more and 0.35 or less ($0.001\times10^{-2}\leq b\leq0.35$), and may also be in a range of 0.00005 or more and 0.30 or less ($0.005\times10^{-2}\leq b\leq0.30$). In the composition represented by the formula (I), the product of the parameter c and 5 shows the molar ratio of Al. The parameter c is preferably in a range of 0.9 or more and 1.1 or less ($0.9\leq c\leq1.1$), and more preferably in a range of 0.95 or more and 1.0 or less ($0.95\leq c\leq1.0$).

Aluminum Oxide

The ceramic complex preferably contains aluminum oxide having a purity of aluminum oxide of 99.0% by mass or more. In the aluminum oxide constituting the base material of the ceramic complex, the aluminum oxide particles as the raw material may be fused to each other to constitute the base material of the ceramic complex in the state where the surface of the aluminum oxide particles is melted, and the grain boundary of the aluminum oxide particles can be confirmed through observation with a scanning electron microscope (SEM).

The aluminum oxide contained in the ceramic complex preferably has a purity of aluminum oxide of 99.0% by mass or more, and more preferably a purity of aluminum oxide of 99.5% by mass or more. In the case where the base material of the ceramic complex is constituted by aluminum oxide having a purity of aluminum oxide of 99.0% by mass or more, the base material may have high transparency. Accordingly, the incident light is passed through the aluminum oxide as the base material, and subjected to wavelength conversion by the rare earth aluminum garnet fluorescent material, and the wavelength conversion efficiency of light can be increased. Furthermore, the base material may be constituted by aluminum oxide having high thermal conductivity, and thus the ceramic complex can have good thermal conductivity. In the case where a light emitting element, such as LED and LD, is used as a light source, the ceramic complex can efficiently radiate heat generated by the light incident from the light emitting element, and thereby the deterioration of the fluorescent material contained in the ceramic complex and the decrease of the light emission intensity thereof can be suppressed. In the case where LD is used as the light source, in particular, the temperature of the ceramic complex, on which light emitted from LD is incident, is increased due to the considerably high light density of light emitted from LD, and the fluorescent material contained in the ceramic complex is liable to be deteriorated due to the temperature. The ceramic complex containing aluminum oxide as the base material has relatively high thermal conductivity. Accordingly, even though light from LD is incident thereon, the heat can be efficiently radiated to suppress the deterioration of the fluorescent material due to the increase of temperature. In the case where the purity of the aluminum oxide constituting the base material of the ceramic complex is less than 99.0% by mass, the transparency to light of the base material may be decreased, and the wavelength conversion efficiency of the ceramic complex may be decreased, resulting in decrease of the extraction efficiency of light.

The content of the aluminum oxide in the ceramic complex is preferably in a range of 50% by mass or more and 85% by mass or less, more preferably in a range of 50% by mass or more and 80% by mass or less, further preferably in a range of 52% by mass or more and 78% by mass or less, and still further preferably in a range of 55% by mass or more and 77% by mass or less, based on the total amount of the rare earth aluminum garnet fluorescent material, the aluminum oxide, and the lutetium oxide as 100% by mass. In the case where the content of the aluminum oxide in the ceramic complex is less than 50% by mass, the amount of the aluminum oxide constituting the base material of the ceramic complex is decreased, and the strength of the ceramic complex may be decreased. In the case where the content of the aluminum oxide in the ceramic complex exceeds 80% by mass, the content of the rare earth aluminum garnet fluorescent material is relatively decreased, and the wavelength conversion efficiency is decreased to decrease the light emission intensity.

Lutetium Oxide

The lutetium oxide contained in the ceramic complex preferably has a purity of lutetium oxide of 99.0% by mass or more, and more preferably a purity of lutetium oxide of 99.5% by mass or more. In the case where the lutetium oxide having a purity of lutetium oxide of 99.0% by mass or more is contained in the ceramic complex, the light incident on the ceramic complex and the light having been subjected to wavelength conversion by the rare earth aluminum garnet fluorescent material are scattered thereby, and thus the extraction efficiency of light is enhanced to enhance the luminous efficiency.

The content of the lutetium oxide in the ceramic complex may be in a range of 0.2% by mass or more and 4.5% by mass or less, preferably in a range of 0.4% by mass or more and 3.0% by mass or less, and more preferably in a range of 0.5% by mass or more and 2.0% by mass or less, based on the total amount of the rare earth aluminum garnet fluorescent material, the aluminum oxide, and the lutetium oxide as 100% by mass. In the case where the content of the lutetium oxide in the ceramic complex is less than 0.2% by mass, the effect of diffusely reflecting light is decreased due to the decreased content of the lutetium oxide, so as to make difficult the enhancement of the extraction efficiency of light, resulting in decrease of the luminous efficiency in some cases. In the case where the content of the lutetium oxide in the ceramic complex exceeds 4.5% by mass, the relative density of the ceramic complex may be decreased to lower the luminous efficiency in some cases.

Method for Producing Ceramic Complex

The method for producing a ceramic complex may include the following steps. A molded body containing rare earth aluminum garnet fluorescent material, aluminum oxide, and lutetium oxide may be prepared. For example, a molded body containing rare earth aluminum garnet fluorescent material particles, aluminum oxide particles, and lutetium oxide particles may be prepared. The molded body may be calcined in an air atmosphere to provide a ceramic complex having a relative density of 90% or more and less than 100%.

In the method for producing a ceramic complex, the rare earth aluminum garnet fluorescent material particles contained in the molded body preferably have a composition represented by the aforementioned formula (I).

The rare earth aluminum garnet fluorescent material particles contained in the ceramic complex may have an average particle diameter in a range of 10 μm or more and 40 μm or less, preferably in a range of 20 μm or more and 38 μm or less, and more preferably in a range of 22 μm or more and 35 μm or less. In the case where the average particle diameter of the rare earth aluminum garnet fluorescent material particles is less than 10 μm, the wavelength conversion efficiency of the incident light may be inferior, and it may be difficult to achieve the enhancement of the light emission intensity in some cases. In the case where the average particle diameter of the rare earth aluminum garnet fluorescent material particles exceeds 40 μm, it may be difficult to arrange the fluorescent material uniformly in the ceramic complex in some cases due to the too large particle diameter of the fluorescent material. The average particle diameter of the rare earth aluminum garnet fluorescent material may be measured by the Fisher sub-sieve sizer method (which may be hereinafter referred to as the FSSS method). The average particle diameter measured by the FSSS method may be referred to as a Fisher sub-sieve sizer's No. The FSSS method is a method for obtaining a particle diameter by measuring the specific surface area by utilizing the flow resistance of air by the air permeability method.

In the method for producing a ceramic complex, the aluminum oxide particles contained in the molded body may have an average particle diameter in a range of 0.2 μm or more and 1.7 μm or less, preferably in a range of 0.3 μm or more and 1.6 μm or less, and more preferably in a range of 0.4 μm or more and 1.5 μm or less. The average particle diameter of the aluminum oxide particles is an average particle diameter that is measured by the FSSS method. In the case where the average particle diameter of the aluminum oxide particles is in a range of 0.2 μm or more and 1.7 μm or less, the rare earth aluminum garnet fluorescent material particles and the aluminum oxide particles can be uniformly mixed, and in the subsequent calcining step, the aluminum oxide particles are melted from the surface thereof to fuse the surfaces of the particles to each other, making the density uniform over the entire bodies, and thereby a ceramic complex having a relative density in a range of 90% or more and less than 100% can be formed. In the case where the average particle diameter of the aluminum oxide particles is less than 0.2 μm, the aluminum oxide particles having a smaller particle diameter are densely fused to each other in calcining, failing to achieve the uniform mixing, and thereby a ceramic complex having a relative density in a range of 90% or more and less than 100% may be difficult to form. In the case where the average particle diameter of the aluminum oxide particles exceeds 1.7 μm, the relative density may be lower than 90% due to the too large particle diameter, and the conversion efficiency of light of the ceramic complex may be deteriorated to lower the light emission efficiency in some cases.

The lutetium oxide particles preferably have an average particle diameter in a rage of 1 μm or more, more preferably in a range of 2 μm or more, and further preferably 3 μm or more. The lutetium oxide particles preferably have an average particle diameter of 10 μm or less, more preferably 8 μm or less, and further preferably 6 μm or less. The average particle diameter of the lutetium oxide particles is an average particle diameter that is measured by the FSSS method. In the case where the average particle diameter of the lutetium oxide is in the range, the rare earth aluminum garnet fluorescent material particles and the lutetium oxide particles can be uniformly mixed, and in the subsequent calcining step, the lutetium oxide particles are melted from the surface thereof to fuse the surfaces of the particles to each other, making the density uniform over the entire articles, and thereby a ceramic complex having a relative density of 90% or more and less than 100% can be formed. In the case where the average particle diameter of the lutetium oxide particles is less than 1 μm, the lutetium oxide particles having a smaller particle diameter are densely fused to each other in calcining, failing to achieve the uniform mixing, and thereby a ceramic complex having a relative density of 90% or more and less than 100% may be difficult to form. In the case where the average particle diameter of the lutetium oxide particles is too large, the relative density may be lower than 90%, and the conversion efficiency of light of the ceramic complex may be deteriorated to lower the light emission efficiency in some cases.

The content of the rare earth aluminum garnet fluorescent material particles, the content of the aluminum oxide particles, and the content of the lutetium oxide particles in the molded body may be the contents thereof described above for the ceramic complex with respect to the total amount thereof. The purities of the rare earth aluminum garnet fluorescent material particles, the aluminum oxide particles, and the lutetium oxide particles may be the purities thereof described above for the ceramic complex.

Figure 1:
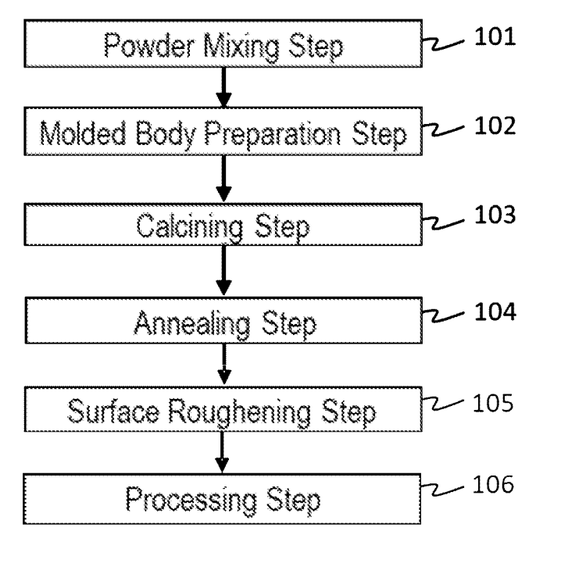
FIG. 1 is a flow chart showing exemplary steps of a process of manufacturing a ceramic complex according to the present disclosure.

FIG. 1 is a flow chart showing one example of the production method of a ceramic complex. The process steps of the method for producing a ceramic complex will be described below with reference to FIG. 1. The method for producing a ceramic complex includes a molded body preparing step 102 and a calcining step 103 of calcining the molded body in an air atmosphere. The method for producing a ceramic complex may include a powder mixing step 101 before the molded body preparing step 102, and may include an annealing step 104 of heat-treating the resulting ceramic complex at a temperature of the calcining temperature or lower, after the calcining step 103. The method for producing a ceramic complex may further include a surface roughening step 105 of subjecting the surface of the ceramic complex to a surface roughening and a processing step 106 of cutting the ceramic complex to the target size or thickness, after the annealing step. As for the order of the surface roughening step 105 and the processing step 106, the processing step 106 may be performed after the surface roughening step 105, and the surface roughening step 105 may be performed after the processing step 106.

Powder Mixing Step

In the powder mixing step, powder containing the particles constituting the molded body is mixed. The powder constituting the molded body may contain the rare earth aluminum garnet fluorescent material particles, the aluminum oxide particles, and the lutetium oxide particles. The powder may be mixed with a mortar and a pestle. The powder may be mixed by using a mixing medium, such as a ball mill. For facilitating the mixing of the powder and the molding of the powder after mixing, a small amount of a molding aid, such as water or ethanol, may be used. The molding aid is preferably a substance that is liable to volatilize in the later calcining step. In the case where the molding aid is added, the amount of the molding aid is preferably 10% by mass or less, more preferably 8% by mass or less, and further preferably 5% by mass or less, based on the powder as 100% by mass.

Molded Body Preparing Step

In the molded body preparing step, the powder containing the rare earth aluminum garnet fluorescent material particles, the aluminum oxide particles, and the lutetium oxide particles is molded into the target shape to provide a molded body. The molding method of the powder may be a known method, such as a press molding method, and examples thereof include a metal mold press molding method and a cold isotactic pressing method (which may be hereinafter referred to as CIP). The molding method may be a combination of two methods for conditioning the shape of the molded body, and the CIP may be performed after performing the metal mold press molding method. The CIP is preferably performed by pressing the molded body by a cold hydro isostatic pressing method using water as the medium.

The pressure in the metal mold press molding method is preferably from 5 MPa to 50 MPa, and more preferably from 5 MPa to 30 MPa. In the case where the pressure in the metal mold press molding method is in the range, the molded body can be conditioned to the target shape.

The pressure in the CIP is preferably from 50 MPa to 200 MPa, and more preferably from 50 MPa to 180 MPa. In the case where the pressure in the CIP is in the range, the rare earth aluminum garnet fluorescent material particles, the aluminum oxide particles, and the lutetium oxide particles can be brought into contact with each other to make the relative density of the ceramic complex obtained after calcining that is 90% or more and less than 100%.

Calcining Step

The calcining step is a process step of calcining the molded body in an air atmosphere to provide a ceramic complex. In the calcining step, the molded body is calcined in an air atmosphere, and thereby a ceramic complex having a relative density of 90% or more and less than 100% can be obtained. The air atmosphere is an atmosphere containing oxygen, and the content of oxygen in the atmosphere is not particularly limited. The content of oxygen in the atmosphere is preferably 5% by volume or more, more preferably 10% by volume or more, and further preferably 15% by volume or more, and may be an atmosphere of the air (having an oxygen content of 20% by volume or more). With an atmosphere containing oxygen in a content of less than 1% by volume, the aluminum oxide particles of the resulting ceramic complex may not grow in some cases.

The calcining temperature is preferably in a range of 1,400° C. or more and 1,800° C. or less, more preferably in a range of 1,500° C. or more and 1,800° C. or less, and further preferably in a range of 1,600° C. or more and 1,780° C. or less. In the case where the calcining temperature is 1,400° C. or more, a ceramic complex having a relative density of 90% or more and less than 100% can be obtained. In the case where the calcining temperature is 1,800° C. or less, the particles contained in the molded body may not be melted, but for example, the surface of the aluminum oxide particles is fused to each other to form the base material with the aluminum oxide, so as to provide a ceramic complex containing the fluorescent material in a state where the grain boundary thereof is clearly confirmed in the aluminum oxide base material. In the case where a ceramic complex having a relative density of 90% or more and less than 100% is obtained, the ceramic complex may be subjected to a hot isostatic pressing (HIP) treatment after the production thereof.

Annealing Step

The method for producing a ceramic complex preferably includes an annealing step of subjecting the ceramic complex obtained by calcining the molded body in an air atmosphere to an annealing in a reducing atmosphere, so as to provide an annealed product. By subjecting the ceramic complex to an annealing treatment in a reducing atmosphere, the activation element having been oxidized in the air atmosphere in the rare earth aluminum garnet fluorescent material can be reduced, and the decrease of the wavelength conversion efficiency and the light emission intensity of the rare earth aluminum garnet fluorescent material can be suppressed. It suffices that the reducing atmosphere is an atmosphere containing at least one rare gas selected from helium, neon, and argon, or nitrogen gas, and hydrogen gas or carbon monoxide gas, and the atmosphere more preferably contains argon or nitrogen gas, and hydrogen gas or carbon monoxide gas.

The temperature in the annealing treatment is preferably in a range of 1,000° C. or more and 1,600° C. or less. The temperature in the annealing treatment is more preferably in a range of 1,000° C. or more and 1,500° C. or less, and further preferably in a range of 1,100° C. or more and 1,400° C. or less. In the case where the temperature in the annealing treatment is in a range of 1,000° C. or more and 1,600° C. or less, the oxidized activation element contained in the rare earth aluminum garnet fluorescent material in the ceramic complex can be reduced without the decrease of the porosity of the ceramic complex, and the decrease of the wavelength conversion efficiency and the light emission intensity can be suppressed.

Surface Roughening Step

The surface roughening step is a process step of subjecting the surface of the ceramic complex or the annealed product of the ceramic complex thus obtained to a surface roughening treatment. The surface roughening step may be performed before the processing step of processing by cutting the ceramic complex to the target size or thickness, or may be performed after the processing step. The ceramic complex or the annealed product of the ceramic complex to be subjected to the surface roughening treatment is preferably a plate-like body having a first principal surface that is to be an incidence surface of light, and a second principal surface that is positioned opposite to the first principal surface and is to be an emission surface of light, and the surface roughening treatment is preferably performed for the second principal surface. The method for performing the surface roughening treatment may be, for example, at least one selected from a method by sand blasting, a method by mechanical grinding, a method by dicing, and a method by chemical etching.

Processing Step

The processing step is a process step of cutting the ceramic complex or the annealed product of the ceramic complex thus obtained to the target size or thickness. The method for cutting may be a known method, and examples thereof include methods of cutting by blade dicing, laser dicing, and a wire saw. Among these, a wire saw is preferred since the cut surface becomes flat to high accuracy. The ceramic composition having the target size or thickness can be obtained by the machining step. The ceramic complex is preferably cut to be a plate-like body having a first principal surface that is to be an incidence surface of light, and a second principal surface that is positioned opposite to the first principal surface and is to be an emission surface of light. The plate-like ceramic complex preferably has a plate thickness in a range of 90 μm or more and 300 μm or less, and more preferably in a range of 95 μm or more and 250 μm or less. In the case where the ceramic complex is cut to have a plate thickness in a range of 90 μm or more and 300 μm or less, the ceramic complex that is readily machined and has an enhanced extraction efficiency of light with the mechanical strength thereof maintained can be obtained.

Light Emitting Device

The light emitting device includes the ceramic complex obtained by the aforementioned production method and a light emitting element. The ceramic complex combined with the light emitting element performs wavelength conversion of at least a part of the light emitting from the light emitting element, so as to constitute the light emitting device that emits mixed light of the light emitted from the light emitting element and the light having been subjected to wavelength conversion. The light emitting element may be, for example, a light emitting element emitting light having a light emission peak wavelength within a wavelength range of 350 nm or more and 500 nm or less. The light emitting element used may be, for example, a light emitting element using a nitride semiconductor ($In_XAl_YGa_{1-X-Y}N$, $0 \leq X$, $0 \leq Y$, $X+Y \leq 1$). The use of a semiconductor light emitting element as the excitation light source can provide a light emitting device having high efficiency, high linearity output with respect to input, and high stability against mechanical impacts.

Projector

The ceramic complex can be used as a light source of a projector by combining an excitation light source. The excitation light source is preferably a semiconductor laser. The projector may use the aforementioned light emitting element as a light source. The excitation light emitted from the semiconductor laser as the excitation light source is incident on the ceramic complex, and mixed light of the light having been subjected to wavelength conversion and the light emitted from the light emitting element is separated with plural optical members constituting an optical system, such as a lens array, a polarization conversion element, and a color separating optical system, into red light, green light, and blue light, which are then modulated according to image information to form color image light. The excitation light emitted from the semiconductor laser as the excitation light source may be made incident on the ceramic complex through optical members constituting an optical system, such as a dichromic mirror or a collimator optical system.

EXAMPLES

Examples relating to the present disclosure will be described in detail below. The present disclosure is not limited to the examples shown below.

Production Example of Rare Earth Aluminum Garnet Fluorescent Material

Yttrium oxide ($Y_2O_3$), gadolinium oxide ($Gd_2O_3$), cerium oxide ($CeO_2$), aluminum oxide ($Al_2O_3$), and gallium oxide ($Ga_2O_3$) were weighed to make the compositional ratios of Examples and Comparative Examples described later, and barium fluoride ($BaF_2$) was added as a flux thereto to provide a raw material mixture, which was mixed in a ball mill. The mixture was placed in an aluminum oxide crucible and calcined in a reducing atmosphere at a temperature in a range of 1,400° C. to 1,600° C. for 10 hours to provide a calcined product. The resulting calcined product was dispersed in pure water, passed through a wet sieve by making a solvent flow while applying various vibrations to the sieve, then dehydrated, dried, and classified with a dry sieve, so as to prepare rare earth aluminum garnet fluorescent material particles having an average particle diameter of 22 μm and a composition represented by $(Y_{0.99}Ce_{0.01})_3(Al_{0.98}Ga_{0.01})_5O_{12}$. The compositional analysis of the rare earth aluminum garnet fluorescent material particles was performed by the following calculation method. The rare earth aluminum garnet fluorescent material obtained by the aforementioned production method was measured for the mass percentages (% by mass) of the elements constituting the rare earth aluminum garnet fluorescent material except for oxygen (i.e., Y, Gd, Ce, Al, and Ga) with ICP-AES (inductively coupled plasma atomic emission spectrometry) (a product name, produced by Perkin Elmer, Inc.), and the molar ratios of the elements were calculated from the values of mass percentages of the elements. The molar ratios of Al and Ga were values obtained in such a manner that assuming the measured molar ratio of the total of Y and Ce as 3, and the molar ratios were calculated based on the molar ratio of 3 for the total of Y and Ce.

Aluminum Oxide Particles

Aluminum oxide particles having an average particle diameter of 0.5 μm and a purity of aluminum oxide of 99.9% by mass were used.

Lutetium Oxide Particles

Lutetium oxide particles having an average particle diameter of 1.2 μm, 2.2 μm, or 3.3 μm and a purity of lutetium oxide of 99.9% by mass were used. The average particle diameters of the rare earth aluminum garnet fluorescent material particles, the aluminum oxide particles, and the lutetium oxide particles were measured by the FSSS method shown below.

Average Particle Diameter

The average particle diameters of the rare earth aluminum garnet fluorescent material particles, the aluminum oxide particles, and the lutetium oxide particles used in Examples and Comparative Examples were measured by the FSSS method. Specifically, by using Fisher Sub-Sieve Sizer Model 95 (produced by Fisher Scientific International, Inc.) under an environment of a room temperature of 25° C. and a relative humidity of 70% RH, 1 $cm^3$ of a specimen (fluorescent material or aluminum oxide particles) was weighed and packed in a dedicated tubular vessel, then dry air at a constant pressure was fed, and the specific surface area was red from the differential pressure, from which the average particle diameter by the FSSS method was calculated.

Examples 1 to 4 and Comparative Examples 4 and 5 of Ceramic Complexes

The rare earth aluminum garnet fluorescent material particles, the aluminum oxide particles, and the lutetium oxide particles described above were weighed to make the contents (i.e., the content ratios (% by mass) based on the total amount of the rare earth aluminum garnet fluorescent material particles, the aluminum oxide particles, and the lutetium oxide particles) of Examples 1 to 4 and Comparative Examples 4 and 5 shown in Table 1 below, and mixed with a dry ball mill to prepare mixed powder for a molded body. After removing the balls used as mixing media from the mixed powder, the mixed powder was charged in a metal mold and molded into a molded body having a cylindrical shape having a diameter of 65 mm and a thickness of 15 mm with a pressure of 10 MPa (102 kgf/$cm^2$). The resulting molded body was vacuum-packed in a packaging container, and subjected to a CIP process at 176 MPa with a cold hydro isostatic pressing device (produced by Kobe Steel, Ltd.). The resulting molded body was calcined by retaining at a temperature of 1,700° C. for 6 hours in an air atmosphere (oxygen concentration: approximately 20% by volume) with a calcining furnace (produced by Marusho Denki Co., Ltd.), so as to provide a ceramic complex. Finally, the resulting ceramic complex was cut to a plate thickness of 230 μm with a wire saw, so as to provide a ceramic complex according to Examples 1 to 4 and Comparative Examples 4 and 5.

Comparative Examples 1 to 3 of Ceramic Complexes

Comparative Example 1

A ceramic complex according to Comparative Example 1 was obtained in the same manner as in Example 1 except that the rare earth aluminum garnet fluorescent material particles and the aluminum oxide particles were weighed to make the contents (i.e., the content ratios (% by mass) based on the total amount of the rare earth aluminum garnet fluorescent material particles, the aluminum oxide particles, and the lutetium oxide particles) shown in Table 1 below, without the use of the lutetium oxide particles contained.

Comparative Examples 2 and 3

Ceramic complexes according to Comparative Examples 2 and 3 were obtained in the same manner as in Example 1 except that yttrium oxide particles or lanthanum oxide particles respectively instead of the lutetium oxide particles, the rare earth aluminum garnet fluorescent material particles, and the aluminum oxide particles were weighed to make the contents (i.e., the content ratios (% by mass) based on the total amount of the rare earth aluminum garnet fluorescent material particles, the aluminum oxide particles, and the lutetium oxide particles) shown in Table 1 below.

ceramic complex of Examples and Comparative Examples was measured with a color luminance meter. In the resulting light emission spectrum, with the position showing the maximum luminance designated as the center (measurement center), the distances (mm) of the two positions, at which the light emission spectrum showed a luminance that was $1/100$ of the maximum luminance ($1/100$ luminance), from the measurement center were measured as absolute values, and the sum of the absolute values of the distances (mm) of the two positions, at which the light emission spectrum showed a luminance that was $1/100$ of the maximum luminance, from the measurement center was designated as the light diameter of outgoing light emitted from the second principal surface. The light diameter ratio, i.e., the ratio of the light diameter of outgoing light emitted from the second principal surface with respect to the light diameter of the incident light incident on the first principal surface, was obtained. Furthermore, the light diameter ratios of Examples and Comparative Examples each were converted to a relative light diameter ratio based on the light diameter ratio of Comparative Example 1.

Luminous Efficiency (%)

The luminous efficiency (%) of the ceramic complexes of Examples and Comparative Examples was measured in the following manner. Specimens of the ceramic complexes of Examples and Comparative Examples each were irradiated with laser light having a wavelength of 455 nm from a laser diode to make the light incident on the specimen with a light diameter of the incident light of 3.5 mm, and the radiant flux of the light emitted from the specimen was measured with an integral sphere. Assuming the radiant flux of Comparative

TABLE 1

| | Fluorescent material Content (% by mass) | Aluminum oxide particles Content (% by mass) | Additive | | Yttrium oxide particles Content (% by mass) | Lanthanum oxide particles Content (% by mass) |
| | | | Lutetium oxide particles | | | |
| | | | Average particle diameter (μm) | Content (% by mass) | | |
|---|---|---|---|---|---|---|
| Example 1 | 29.9 | 69.6 | 1.2 | 0.5 | — | — |
| Example 2 | 29.9 | 69.6 | 2.2 | 0.5 | — | — |
| Example 3 | 29.9 | 69.6 | 3.3 | 0.5 | — | — |
| Example 4 | 29.7 | 69.3 | 3.3 | 1.0 | — | — |
| Comparative Example 1 | 30 | 70 | — | — | — | — |
| Comparative Example 2 | 29.7 | 69.3 | — | — | 1.0 | — |
| Comparative Example 3 | 29.9 | 69.6 | — | — | — | 0.5 |
| Comparative Example 4 | 30 | 69.9 | 3.3 | 0.1 | — | — |
| Comparative Example 5 | 28.6 | 66.6 | 3.3 | 4.8 | — | — |

Light Diameter Ratio (Light Diameter of Outgoing Light/Light Diameter of Incident Light)

Specimens of the ceramic complexes of Examples and Comparative Examples each were irradiated with laser light having a wavelength of 455 nm from a laser diode to make a light diameter of the incident light of 3.5 mm, and the light diameter of the laser light was designated as the light diameter of the incident light to be allowed to enter the first principal surface of the specimen. The light diameter of outgoing light emitted from the second principal surface of the ceramic complex was measured in the following manner. The light emission luminance of the light emitted from the Example 1 as 100%, the radiant flux obtained by measuring each of the specimens of Examples and Comparative Examples was converted to the relative light flux (%) with respect to the radiant flux of Comparative Example 1. The relative light flux (%) was divided by the aforementioned light diameter ratio to provide a value, which was designated as the relative luminous efficiency (%).

The results are shown in Table 2. The relative density (%) of the ceramic complex of Examples and Comparative Examples was calculated by the calculation formulae (1) to (3) described above.

TABLE 2

| | Characteristics of ceramic complex (relative values) | | | |
|---|---|---|---|---|
| | Relative density (%) | Luminous efficiency (%) | Relative light flux (%) | Light diameter ratio (outgoing light/incident light) |
| Example 1 | 96.4 | 102.3 | 99.5 | 0.973 |
| Example 2 | 96.6 | 102.6 | 101.3 | 0.987 |
| Example 3 | 96.4 | 103.0 | 99.3 | 0.964 |
| Example 4 | 96.3 | 103.4 | 100.2 | 0.969 |
| Comparative Example 1 | 96.9 | 100.0 | 100.0 | 1.00 |
| Comparative Example 2 | 96.3 | 100.2 | 99.8 | 0.996 |
| Comparative Example 3 | 94.6 | — | — | — |
| Comparative Example 4 | 96.3 | 96.5 | 99.2 | 1.028 |
| Comparative Example 5 | 95.1 | 95.4 | 92.9 | 0.974 |

As shown in Table 2, the ceramic complexes of Examples 1 to 4 can have an enhanced luminous efficiency as compared to the ceramic complex of Comparative Example 1. It is estimated that this is because the proportion of the incident light that is passed without wavelength conversion is small due to lutetium oxide contained in the ceramic complex, and the incident light is efficiently subjected to wavelength conversion with the rare earth aluminum garnet fluorescent material, and emitted to the outside of the ceramic complex. It is considered that the ceramic complex of Comparative Example 4 has a content of lutetium oxide that is smaller than Examples 1 to 4, and thus the luminous efficiency thereof is lowered due to less scattering of the incident light. The ceramic complex of Comparative Example 5 has a content of lutetium oxide that is larger than Comparative Examples 1 to 4, and thus has a lowered relative density and a smaller luminescent efficiency than Comparative Example 1.

As shown in Table 2, the ceramic complexes of Examples 1 to 4 can have a light diameter ratio that is smaller than the ceramic complex of Comparative Example 1. On the other hand, it is considered that the ceramic complex of Comparative Example 4 has a content of lutetium oxide that is smaller than Examples 1 to 4, and thus the light diameter ratio is increased due to less scattering of the incident light.

As shown in Table 2, the ceramic complex of Comparative Example 2 has a luminous efficiency and a relative light flux that are substantially equivalent to Comparative Example 1. The ceramic complex of Comparative Example 3 has a relative density that is smaller than Comparative Example 1, and thus is assumed to have a lower luminous efficiency than Comparative Example 1.

The ceramic complex combined with a light emitting element, such as LED or LD, can be used as a light source for automobile use, generic illumination use, a backlight for a liquid crystal display device, a projector, and the like.

The invention claimed is:

1. A ceramic complex comprising a rare earth aluminum garnet fluorescent material, aluminum oxide, and lutetium oxide, having a content of the rare earth aluminum garnet fluorescent material in a range of 15% by mass or more and 50% by mass or less, and a content of the lutetium oxide in a range of 0.2% by mass or more and 4.5% by mass or less, based on a total amount of the rare earth aluminum garnet fluorescent material, the aluminum oxide, and the lutetium oxide as 100% by mass.

2. The ceramic complex according to claim 1, wherein the rare earth aluminum garnet fluorescent material has a composition represented by the following formula (I):

$$(Ln_{1-a}Ce_a)_3(Al_cGa_b)_5O_{12} \qquad (I)$$

wherein Ln represents at least one rare earth element selected from the group consisting of Y, Gd, Lu, and Tb, and a, b, and c each satisfy $0<a\leq0.022$, $0\leq b\leq0.4$, $0<c\leq1.1$, and $0.9\leq b+c\leq1.1$.

3. The ceramic complex according to claim 1, wherein the ceramic complex has a plate-like body that comprises a first principal surface serving as an incident surface of light and a second principal surface serving as an outgoing surface of light, which is positioned on an opposite side to the first principal surface, and a plate thickness of the plate-like body is in a range of 90 µm or more and 300 µm or less.

4. The ceramic complex according to claim 3, wherein a ratio of a light diameter of outgoing light emitted from the second principal surface to a light diameter of incident light to be allowed to enter the first principal surface is in a range of 0.4 or more and less than 1.0.

5. A projector comprising the ceramic complex according to claim 1, and an excitation light source including a semiconductor laser.

6. A method for producing a ceramic complex, comprising:
preparing a molded body containing rare earth aluminum garnet fluorescent material, aluminum oxide, and lutetium oxide, and having a content of the rare earth aluminum garnet fluorescent material in a range of 15% by mass or more and 50% by mass or less, and a content of the lutetium oxide in a range of 0.2% by mass or more and 4.5% by mass or less, based on the total amount of the rare earth aluminum garnet fluorescent material, the aluminum oxide, and the lutetium oxide as 100% by mass; and
calcining the molded body in an air atmosphere to obtain a ceramic complex having a relative density in a range of 90% or more and less than 100%.

7. The method for producing a ceramic complex according to claim 6, wherein a temperature in calcining is in a range of 1,400° C. or more and 1,800° C. or less.

8. The method for producing a ceramic complex according to claim 6, further comprises: subjecting the ceramic complex to an annealing treatment in a reducing atmosphere, after calcining.

9. The method for producing a ceramic complex according to claim 8, wherein a temperature in the annealing treatment is in a range of 1,000° C. or more and 1,600° C. or less.

10. The method for producing a ceramic complex according to claim 6, wherein the rare earth aluminum garnet fluorescent material has a composition represented by the following formula (I):

$$(Ln_{1-a}Ce_a)_3(Al_cGa_b)_5O_{12} \qquad (I)$$

wherein Ln represents at least one rare earth element selected from the group consisting of Y, Gd, Lu, and Tb, and a, b, and c each satisfy $0<a\leq0.022$, $0\leq b\leq0.4$, $0<c\leq1.1$, and $0.9\leq b+c\leq1.1$.

* * * * *